(12) United States Patent
Börger et al.

(10) Patent No.: US 12,258,450 B2
(45) Date of Patent: Mar. 25, 2025

(54) RUBBER COMPOSITIONS CONTAINING POLYORGANOSILOXANES AS PLASTICIZERS

(71) Applicant: SCHILL + SEILACHER STRUKTOL GMBH, Hamburg (DE)

(72) Inventors: Volker Börger, Hamburg (DE); Dörte Becker, Hamburg (DE); Theresia Klose, Dresden (DE); Uwe Dittrich, Radebeul (DE)

(73) Assignee: SCHILL + SEILACHER STRUKTOL GMBH, Hamburg (DE)

( * ) Notice: Subject to any disclaimer, the term of this patent is extended or adjusted under 35 U.S.C. 154(b) by 437 days.

(21) Appl. No.: 17/596,838

(22) PCT Filed: Jun. 26, 2020

(86) PCT No.: PCT/EP2020/068023
§ 371 (c)(1),
(2) Date: Dec. 20, 2021

(87) PCT Pub. No.: WO2020/260580
PCT Pub. Date: Dec. 30, 2020

(65) Prior Publication Data
US 2022/0315708 A1 Oct. 6, 2022

(30) Foreign Application Priority Data
Jun. 27, 2019 (EP) ..................... 19182809

(51) Int. Cl.
| | | |
|---|---|---|
| *B60C 1/00* | (2006.01) | |
| *C08F 236/08* | (2006.01) | |
| *C08G 77/20* | (2006.01) | |
| *C08L 11/00* | (2006.01) | |
| *C08L 15/02* | (2006.01) | |
| *C08L 23/22* | (2006.01) | |
| *C08L 91/00* | (2006.01) | |

(52) U.S. Cl.
CPC .............. *C08G 77/20* (2013.01); *B60C 1/00* (2013.01); *C08F 236/08* (2013.01); *C08L 11/00* (2013.01); *C08L 15/02* (2013.01); *C08L 23/22* (2013.01); *C08L 91/00* (2013.01)

(58) Field of Classification Search
CPC ....... C08G 77/20; C08F 236/08; C08L 23/22; C08L 11/00; C08L 15/02; C08L 91/00; B60C 1/00
USPC ........................................... 523/156
See application file for complete search history.

(56) References Cited

U.S. PATENT DOCUMENTS

| | | | | |
|---|---|---|---|---|
| 4,710,541 A | * | 12/1987 | Tomita ..................... | C08L 23/02 264/315 |
| 2011/0262573 A1 | | 10/2011 | Tanno et al. | |
| 2013/0046059 A1 | * | 2/2013 | Borger ...................... | C08L 9/00 525/105 |

FOREIGN PATENT DOCUMENTS

| | | |
|---|---|---|
| CN | 109369979 | 2/2019 |
| EP | 2151479 | 2/2010 |
| EP | 2354145 | 8/2011 |
| JP | 2017008202 | 1/2017 |
| WO | WO 2011/083049 | 7/2011 |

OTHER PUBLICATIONS

International Preliminary Report on Patentability issued in Corresponding PCT Application No. PCT/EP2020/068023, dated Dec. 28, 2021 (English Translation provided).
International Search Report and Written Opinion issued in Corresponding PCT Application No. PCT/EP2020/068023, dated Jul. 28, 2020 (English Translation provided).

* cited by examiner

*Primary Examiner* — Deve V Hall
(74) *Attorney, Agent, or Firm* — NORTON ROSE FULBRIGHT US LLP (57) ABSTRACT

The invention relates to rubber compositions that are provided with polyorganosiloxanes as plasticizers. The rubber compositions can be vulcanized by means of a cross-linking resin and they are particularly suitable for use as curing bladders in the production of tires. The invention further relates to the use of polyorganosiloxanes as corresponding plasticizers.

17 Claims, 2 Drawing Sheets

RUBBER COMPOSITIONS CONTAINING POLYORGANOSILOXANES AS PLASTICIZERS

CROSS-REFERENCE TO RELATED APPLICATIONS

This application is a national phase application under 35 U.S.C. § 371 of International Application No. PCT/EP2020/068023 filed Jun. 26, 2020, which claims the benefit of priority of European Patent Application No. 19182809.4 filed Jun. 27, 2019. The contents of the referenced applications are incorporated into the present application by reference.

FIELD OF THE INVENTION

The present invention relates to rubber compositions that are provided with polyorganosiloxanes as plasticizers.

In particular, the present invention relates to the use of polyorganosiloxanes modified with (meth)acrylate as plasticizers in rubber compositions, which are used as bladders in tyre production.

The present invention furthermore relates to rubber compositions which are suitable in particular for the production of and use in bladders for the production of tyres.

BACKGROUND OF THE INVENTION

Rubber compositions which are vulcanized by means of resin crosslinking are known and have a wide variety of applications in various branches of industry. Rubber articles on this basis are for example used for the production of bladders, which are used in the production of tyres of all kinds.

In tyre production itself, the uncrosslinked green tyre is vulcanized. The process of vulcanization describes the crosslinking of rubber compositions under pressure and increased temperature. In the process, covalent bonds are formed between the polymers and an elastomer network is constructed.

The vulcanization of rubber mixtures can take place via various mechanisms. The type of vulcanization most frequently used is sulfur vulcanization. Rubber mixtures can, in addition, also be crosslinked or vulcanized using peroxides, amines or resins.

For the production of a vehicle tyre, the green tyre is placed in a tyre press for the moulding and vulcanized. Bladders have the function of pressing the green tyre against the inner wall of the tyre press during the vulcanization under pressure and at high temperatures, in order to give the tyre its tread pattern. For this purpose, the bladder takes in a pressurizing medium such as for example hot water or steam.

The required bladders can be made from rubber compositions. As a rule, rubber compositions for bladders consist of a polymer system, filler, zinc oxide, plasticizing oil and crosslinking resin. In addition, conventional further processing additives are constituents of the rubber composition.

The polymer is often butyl rubber, optionally with the addition of chloroprene rubber if the crosslinking resin is not halogenated. Carbon black is often used as filler. Zinc oxide functions as a catalyst for the resin crosslinking and is used to improve the thermal conductivity. In known bladders, such as described in more detail below, castor oil is used as plasticizing oil. Optionally halogenated alkylphenol-formaldehyde resin with methylol groups is normally used as crosslinking resin. Further additives, such as for example homogenizers, can furthermore be added to the corresponding compositions. Bladders are also described which contain both butyl rubber and rubber with units derived from α-methylstyrene as polymer system.

During the vulcanization of a tyre, a bladder goes through a cycle which consists of a filling process, inflating with pressurizing medium, and subsequent decompression, releasing the pressurizing medium. The bladder is thereby subjected to a mechanical load. In addition to this mechanical load, the corresponding physical conditions also change substantially while going through the cycle, however. The significant pressure and temperature changes are particularly relevant here.

The material used in the bladder must take this particular form of loads into account, in particular against the background of being able to produce the largest possible number of tyres with one bladder. The bladder goes through a different number of cycles depending on various factors, such as tyre size or vulcanization conditions.

In spite of this, however, signs of fatigue appear in every bladder after a certain level of load and ultimately failure occurs due to the formation of cracks for example, with the result that the bladder has to be replaced.

This leads to an undesired interruption of the continuous tyre production process. Furthermore, additional costs arise due to the replacement. Thus there is an ongoing interest in providing bladders with the longest possible service life. This is because extending the service life is not only accompanied by a substantial increase in efficiency and cost saving for the relevant tyre producers, but it also makes a significant contribution towards guaranteeing a generally more environmentally friendly tyre production.

In order to counteract the considerable loads during the intended use, the presence of a plasticizer component in rubber-based bladders is essential. In this context, castor oil in particular has already been used as plasticizer component in rubber-based bladders since the 1950s, as described for example in DE 1 283 521.

Castor oil is regarded as a particularly suitable plasticizer and has proved to be successful in past decades, as it has a relatively low volatility even at high temperatures and is generally suitable for reducing the tendency of resin-crosslinked mixtures to exhibit a so-called marching modulus during the crosslinking. In this context, a low modulus and a good resistance to steam ageing is described for castor oil-containing rubber compositions in WO 2013/052206 A1, wherein here it is attempted, in addition to castor oil, to further increase the resistance of the bladders to be produced through the addition of hydrocarbon resins (hydrocarbon polymer modifiers (HPM)).

In spite of the advantages provided by the use of castor oil in the rubber compositions in question, the bladders produced from the corresponding compositions fail after a certain number of vulcanization cycles. To date, the desired long service life of the bladders has also not been successfully achieved through the addition of castor oil.

EP 2 354 154 A1 and EP 2 151 479 A1 relate to rubber compositions, which are peroxidically vulcanized and contain polyorganosiloxanes which are to improve the viscosity of the rubber during the processing without deterioration of relevant mechanical properties of the vulcanisate obtained (for example the modulus decreases). These polyorganosiloxanes have at least one organic moiety R, which has at least one carbon-carbon multiple bond, and optionally a further hydrocarbon moiety R2 having a chain length of from 5 to 50 carbon atoms. It should be pointed out that no conclusions can be drawn from the effect of an additive during the processing of rubber, such as e.g. a lowering of the viscosity, about the finished vulcanisate, e.g. in relation to particular target physical properties, such as are attributed to plasticizers, such as for example deformability, elastic properties or reduced hardness.

US 2011/0262573 A1 describes a method for manufacturing a bladder for manufacturing tyres, in which the surface of the bladder is modified by applying a layer, which functions as a release agent, but is firmly fixed to the surface of the bladder which faces the inside of the tyre. Castor oil is used as plasticizer in the bladder rubber compositions known from US 2011/0262573 A1.

A polyorganosiloxane used in US 2011/0262573 A1 for the surface coating of a release agent substitute has a high molecular weight of up to 12,000 (average molecular weight, number average).

U.S. Pat. No. 4,710,541 describes a process for moulding and vulcanizing rubber products such as tyres, in which an improved bladder is used. The bladder described in U.S. Pat. No. 4,710,541 is modified in order to improve its release properties from the tyre material, e.g. via a suitable surface modification. The invention described in U.S. Pat. No. 4,710,541 is thus seeking a substitute for conventional release agents. The polyorganosiloxane described in U.S. Pat. No. 4,710,541 is in particular a high-molecular-weight polyorganosiloxane having a degree of polymerization of >1000, such as for example 7000 dimethylsiloxy units. It is used in large proportions of for example 30 parts by weight to 70 parts by weight rubber.

Despite various improvements in the field of rubber compositions there is thus a substantial need for new improved rubber compositions which are not only suitable, themselves, for being vulcanized to form a bladder that can be used for tyre production, but rather for providing bladders which have a longer service life, taking into account the significant load on the material occurring in the course of the vulcanization cycle for tyre production.

SUMMARY OF THE INVENTION

According to a first aspect, the present invention relates to the use of one or more modified polyorganosiloxanes as plasticizers in rubber compositions, wherein the rubber is vulcanized by means of one or more crosslinking resins, wherein the polyorganosiloxane contains 3 or more siloxane units and one or more organic moieties $R^1$, which have one or more carbon-carbon multiple bonds and at least 4 carbon atoms.

According to a further aspect, the present invention relates to a method for producing a bladder for tyre production, in which a rubber composition which contains one or more modified polyorganosiloxanes, one or more crosslinking resins for crosslinking and optionally further conventional additives is vulcanized by means of the crosslinking resin, wherein the modified polyorganosiloxane and the rubber composition are as defined herein.

Finally, the present invention relates to a bladder for tyre production, which comprises a rubber composition that can be vulcanized using crosslinking resin, which rubber composition comprises modified polyorganosiloxane and has been vulcanized by means of the crosslinking resin, wherein the modified polyorganosiloxane and the rubber composition are as defined herein.

By "modified" is meant the presence of an organic moiety $R^1$ in the polyorganosiloxane according to the invention.

If a feature of the invention can be present in one or more different embodiments, then variants that are described in detail in the following relate to all of the (different) embodiments, even if the plural is not explicitly used.

Preferred embodiments of the invention can consist of the features disclosed in the following, without further components being present.

DETAILED DESCRIPTION OF THE INVENTION

The inventors have surprisingly found that the use of particular polyorganosiloxanes, which carry functional groups ("modified polyorganosiloxanes"), as plasticizers in rubber compositions which can be used in bladders for tyre production, solves the problem according to the invention. In particular if the castor oil usually used in the basic rubber compositions is partially or completely replaced by the polyorganosiloxanes according to the invention, bladders for tyre production can be produced which have a longer service life compared with the previously known bladders.

The plasticizer according to the invention therefore acts in the volume of the rubber composition which contains it. A material that is only present on the surface of a rubber composition, e.g. a layer that is temporarily or permanently bound thereto, is not suitable according to the invention as plasticizer.

Polyorganosiloxanes

Polyorganosiloxanes per se are known substances. They are (macro)molecules which are built up according to the scheme $(R_2SiO)_x$, wherein R are usually hydrocarbon radicals (most commonly methyl, less commonly ethyl, propyl, phenyl, etc.), see e.g. Rompp's Chemistry Lexicon 9th Edition 1992 Volume 5, p. 4168).

The polyorganosiloxanes used according to the invention are characterized in that they have 3 or more siloxane units and have one or more organic moieties $R^1$, in particular two or more organic moieties $R^1$, and preferably one or more hydrocarbon moieties $R^2$.

Moieties $R^1$ and $R^2$ present in a polyorganosiloxane according to the invention can in each case be identical or different.

Organic Moiety $R^1$

Polyorganosiloxanes used according to the invention have one or more organic moieties $R^1$, wherein $R^1$ contains one or more carbon-carbon multiple bonds and has at least 4 carbon atoms.

It is preferred for the carbon-carbon multiple bond in $R^1$ to be a carbon-carbon double bond, for example in a carbon chain or a ring of carbon atoms. In a preferred embodiment, the organic moiety $R^1$ is a monovalent radical.

In all embodiments of the invention, polyorganosiloxanes in which $R^1$ has at least five carbon atoms, such as for example at least six, in particular at least seven carbon atoms are particularly preferred.

It is preferred for the polyorganosiloxane according to the invention to have at least two carbon-carbon multiple bonds. This means that if the group $R^1$ has only a single carbon-carbon multiple bond then at least two groups $R^1$ must be present. This embodiment is preferred. Alternatively, it is possible for a group $R^1$ to have at least two carbon-carbon multiple bonds. However, this embodiment is not preferred because the preparation of the corresponding polyorganosiloxanes is more complex.

For example, cycloalkenyl, alkenyl, vinyl-containing groups, allyl-containing groups, norbornyl, (di)cyclopentenyl or groups derived from unsaturated acyloxy groups such as from methacrylate or acrylate come into consideration as $R^1$. Preferred monovalent radicals $R^1$ are derived from cyclohexene and (meth)acrylate, in particular (meth)acrylate-derived radicals $R^1$, which are bound to the backbone of the polyorganosiloxane via a hydrocarbon chain, which can be substituted with one or more heteroatoms such as oxygen or sulfur and/or interrupted by one or more heteroatoms such as oxygen and sulfur.

According to a preferred embodiment, $R^1$ is a monovalent unsaturated acyloxy radical (i.e. a radical of the RCOO— type) with up to 15 C atoms (total number of C atoms including any substituents), wherein the acyloxy radical terminally (i.e. in the unit R) carries a substituted or unsubstituted double bond and is bound to a silicon atom of the backbone of the polyorganosiloxane via a hydrocarbon chain, which preferably contains at least one oxygen atom in the chain and is preferably substituted with at least one hydroxyl group. The substituents on the C atoms of the terminal double bonds are preferably methyl groups, in particular one methyl group (such as in the case of a group derived from methacrylate $CH_2=C(CH_3)COO—$).

Particularly preferred examples of $R^1$ are the following groups

The carbon atom which is bound to the silicon atom is in each case indicated with an arrow.

These functionalizations are accessible by reaction of an SiH unit with a compound which has a double bond available for hydrosilylation, such as for example:
(A) allyl (meth)acrylate,
(B) 4-vinylcyclohexene or
(C) allyl glycidyl ether with subsequent opening of the epoxide ring by reaction with (meth)acrylic acid.

The reaction (C), whereby the above structure (c) is formed, is particularly preferred. Polyorganosiloxanes of this general type are known, for example, from EP 0 269 114 A2 and DE 30 44 237 A1.

The number of carbon atoms between the silicon atom which carries the group $R^1$ and the carbon-carbon multiple bond is preferably 1 to 10, more preferably 2 to 7, such as for example 4. In the case of cyclic groups or groups containing a ring, the shortest route to the double bond is counted.

In a preferred embodiment, $R^1$ is present in the polyorganosiloxane according to the invention as part of the structural unit I $$[R^1_x R_a SiO_{[4-(x+a)]/2}] \quad (I),$$

wherein x is equal to 1, 2 or 3 and preferably 1, a is equal to 0, 1 or 2, preferably 1 or 2 and in particular 2 and R is a linear or branched alkyl radical, a cycloalkyl radical or aromatic radical with up to 9 C atoms, in particular up to 6 C atoms. R is preferably selected from methyl, ethyl, propyl, butyl, pentyl or phenyl, wherein R is particularly preferably methyl.

Preferred structural units I where x=1 are a difunctional structural unit $I^D$ where a=1:

$$[R^1 R SiO_{2/2}] \quad (I^D),$$

and a monofunctional structural unit $I^M$ where x=1 and a=2:

$$[R^1 R_2 SiO_{1/2}] \quad (I^M).$$

Preferred polyorganosiloxanes according to the invention have from 15 to 70, preferably 20 to 40 or 50 and in particular 20 to 30 structural units of the $I^D$ type, which is a measure of the chain length of the polyorganosiloxane.

Hydrocarbon Moiety $R^2$

Polyorganosiloxanes according to the invention optionally have one or more longer alkyl radicals $R^2$, wherein $R^2$ has a chain length of from 5 to 50 carbon atoms.

According to an embodiment, $R^2$ is selected from branched or unbranched alkyl groups with 5 to 30 C atoms, in particular unbranched alkyl groups with 5 to 30 C atoms, such as n-$C_8$ to $C_{30}$ alkyl, preferably n-$C_{13}$ to $C_{28}$ alkyl, more preferably n-$C_{12}$ to $C_{18}$ alkyl, such as for example n-$C_{18}$ alkyl.

The alkyl radical $R^2$ is preferably contained in the polyorganosiloxane as part of the unit II $$[R^2_y R'_b SiO_{[4-(y+b)]/2}] \quad (II),$$

wherein y is equal to 1, 2 or 3 and preferably 1, b is equal to 0, 1 or 2, preferably 1 or 2 and in particular 1, and R' is a monovalent organic radical as defined above for R in relation to structural unit (I), but is chosen independently of R. Preferably, R' is selected from methyl, ethyl, propyl, butyl, pentyl or phenyl, wherein R' is particularly preferably methyl.

Preferred structural units II where y=1 are a difunctional structural unit $II^D$ where b=1:

$$[R^2 R' SiO_{2/2}] \quad (II^D),$$

and a monofunctional structural unit $II^M$ where y=1 and b=2:

$$[R^2 R'_2 SiO_{1/2}] \quad (II^M)$$

Structure of the Polyorganosiloxane

In addition to the structural units I and II mentioned which are preferably present, polyorganosiloxanes according to the invention preferably also have the difunctional structural unit $III^D$:

wherein the radicals R" are identical or different (and are preferably identical) and are selected from linear alkyl radicals, branched alkyl radicals, cycloalkyl radicals or aromatic radicals, which can be bound to the polyorganosiloxane via an oxygen atom, and the radicals R" are preferably methyl, ethyl, propyl and phenyl, in particular methyl.

In an embodiment, one (or two) monofunctional structural units $III^M$ is (are) also present in the polyorganosiloxane according to the invention:

wherein the radicals R''' are identical or different and are selected from hydroxyl radicals and linear alkyl radicals, branched alkyl radicals, cycloalkyl radicals or aromatic radicals, which can be bound via an oxygen atom, and the radicals R''' are preferably hydroxyl, methyl, ethyl, propyl and phenyl, in particular hydroxyl and methyl. In a particularly preferred embodiment, the radicals R''' are identical and are methyl groups.

A preferred structure of a polyorganosiloxane according to the invention is as follows:

wherein
(i) m and o independently of each other lie in the range of from 0 to 40 and n and p independently of each other can be 0, 1 or 2,
   with the proviso that the sum (m+n) is at least 1 and preferably the sum (o+p) is at least 1,
   with the further proviso that the sum (n+p) is at most 2, wherein the sum (m+n+o+p) preferably lies in the range up to 20, and
(ii) q lies in the range of from 0 to 100.

The difunctional structural units $I^D$, $II^D$ and $III^D$ in the polyorganosiloxane according to the invention are typically and preferably not arranged as a block, but statistically distributed along the polysiloxane chain. For a person skilled in the art, it is also clear that the parameters m, n, o, p and q are average values, because the polyorganosiloxanes according to the invention typically do not arise as defined compounds during production.

In a preferred embodiment, n is equal to 1 or 2 and preferably 2, i.e., the $R^1$ functionalization in the polyorganosiloxane is (at least also) contained in monofunctional (terminal) structural units $I^M$.

In a further preferred embodiment, n is equal to 2 and m is equal to zero (0), i.e., the $R^1$ functionalization in the polyorganosiloxane is exclusively contained in monofunctional (terminal) structural units $I^M$.

In a further preferred embodiment, n is equal to 1 or 2, preferably 2, and m is not equal to zero (0), i.e., the $R^1$ functionalization in the polyorganosiloxane is contained both in monofunctional (terminal) structural units $I^M$ as well as in the difunctional (bridging) structural units $I^D$, just as when m=1 or 2.

In all embodiments of the invention it is preferred that the moiety $R^1$ is bound to a different silicon atom as the moiety $R^2$.

In a preferred embodiment, the total number of siloxane units of the polyorganosiloxanes according to the invention, (m+o+q+2), is 10 to 100, more preferably 15 to 70, in particular 20 to 50, such as 20 to 30 or 40.

In a further preferred embodiment, the sum of the functionalized siloxane units in the polyorganosiloxanes according to the invention, (m+n+o+p), is 2 to 15, more preferably 2 to 6 or 10.

Preferred ratios of functionalizations with $R^1$ and $R^2$ in difunctional siloxane units $I^D$ and $II^D$ are (i.e. m/o is) 10/90 to 99/1, more preferably 30/70 to 98/2, in particular 50/50 to 97/3, such as 70/30 to 96/4 or 75/25 to 95/5.

The number of unsubstituted difunctional siloxane units $III^D$ (q) in the polyorganosiloxanes according to the invention is preferably 5 to 60, more preferably 10 to 50, in particular 15 to 40, such as 20 to 30.

Polyorganosiloxanes according to the invention can be present as compounds with a high viscosity that are liquid at room temperature (25° C.). Depending on, among other things, the length of the siloxane chain (i.e. sum of the SiO units, sum (m+o+q+2), from approximately 30), possibly the length of the hydrocarbon moiety $R^2$ (from approximately 20 carbon atoms) and the possible number of hydrocarbon moieties $R^2$, the polyorganosiloxanes according to the invention may be solid at room temperature.

It is possible to use the polyorganosiloxane according to the invention as a masterbatch, which contains
   a) one or more rubbers and
   b) one or more polyorganosiloxanes according to the invention.

The masterbatch preferably contains 0.5 to 30 parts by weight polyorganosiloxane according to the invention, more preferably 0.5 to 20 parts by weight and in particular 0.5 to 10 parts by weight polyorganosiloxane, relative to 100 parts by weight rubber (phr, parts per hundred parts rubber). Rubbers that can be crosslinked by means of crosslinking resin, such as for example butyl rubber and chloroprene rubber, are typically used as rubbers in the masterbatch.

The use of a masterbatch makes it easier to incorporate the polyorganosiloxane according to the invention into a rubber.

In addition, it is possible to use the polyorganosiloxane according to the invention in the form of a blend, which contains
   a) one or more solid carrier materials (preferably selected from inorganic fillers (such as for example silica) or wax-like materials (such as for example polyethylene waxes)) and
   b) one or more polyorganosiloxanes according to the invention.

The weight ratio of a) carrier material to b) polyorganosiloxane according to the invention in the blend is preferably 10/90 to 90/10, more preferably 20/80 to 80/20 and particularly preferably approximately 60/40. Preferred materials for blends are silicas or other inorganic fillers such as for example chalk or wax-like materials such as for example polyethylene waxes.

In particular, the use of a blend makes handling of the polyorganosiloxanes according to the invention easier if they are liquid at room temperature.

Method for Preparing Polyorganosiloxanes According to the Invention

In a preferred method for preparing the polyorganosiloxanes according to the invention,
   a) a polyorganosiloxane which has two or more SiH groups is reacted with a compound which has at least one group $R^1$ in order to obtain a polyorganosiloxane with at least one group $R^1$ and optionally one or more remaining SiH groups, and b) optionally the polyorganosiloxane obtained in step a) with at least one or more remaining SiH groups is reacted with an α-olefin in order to obtain a polyorganosiloxane according to the invention.

In a particularly preferred method for preparing the polyorganosiloxanes according to the invention, a) a polyorganosiloxane which has two or more SiH groups is reacted with a compound which has at least one hydrosilylatable group and a further functional group $R^3$ different therefrom, which is inert under standard hydrosilylation conditions, such as an epoxide, in particular a glycidyl ether, in order to obtain a polyorganosiloxane with at least one group $R^3$, and b) the polyorganosiloxane obtained in step a) is reacted with a compound which has at least one group $R^1$ and a further functional group $R^4$ different therefrom, which is suitable for selectively forming a bond with the group $R^3$, in order to obtain a polyorganosiloxane with at least one group $R^1$ and optionally one or more remaining unreacted $R^3$ groups, and c) optionally the polyorganosiloxane obtained in step b) is reacted with a compound which has at least one group $R^2$ and a further functional group $R^4$ different therefrom, which is suitable for selectively forming a bond with the group $R^3$, in order to obtain a polyorganosiloxane according to the invention.

In an alternative method for preparing the polyorganosiloxanes according to the invention, a) a silane which has one or more hydrolyzable groups is functionalized with a group $R^1$, b) optionally a silane which has one or more hydrolyzable groups is functionalized with a group $R^2$, c) the compound obtained in step a) is reacted with the optional compound obtained in step b) together with a compound providing the siloxane backbone, such as octamethylcyclotetrasiloxane, under basic conditions in water.

Use and Vulcanization Methods

The polyorganosiloxanes are used as plasticizers in rubber compositions according to the invention. In other words, the polyorganosiloxanes according to the invention act in the volume of the rubber composition into which they are incorporated, in contrast to a pure modification of the surface of the rubber composition (if it is present as a moulded part with a defined surface). According to an embodiment of the present invention, the rubber composition is not modified with a coating on the surface.

The rubber composition preferably contains 0.5 to 30 parts by weight polyorganosiloxane according to the invention, more preferably 0.5 to 20 parts by weight, particularly preferably 1 to 15 parts by weight, and in particular 2 to 8 parts by weight polyorganosiloxane, relative to 100 parts by weight rubber (phr, parts per hundred parts rubber). The rubber composition preferably contains 1 to 10 phr polyorganosiloxane according to the invention. The rubber composition preferably contains 2 to 7 phr polyorganosiloxane according to the invention. The rubber composition preferably contains 2.5 to 6.5 phr polyorganosiloxane according to the invention. The rubber composition preferably contains 6 phr polyorganosiloxane according to the invention.

In a preferred embodiment, the rubber is a rubber that can be crosslinked by means of crosslinking resin. In particular, such rubbers that can be crosslinked using crosslinking resin cannot be vulcanized using peroxidic crosslinkers as these rubbers degrade under the respective reaction conditions.

Rubbers which are suitable in particular for the production of bladders which can be used in the production of tyres are used according to the invention.

Preferred rubbers which can be used within the framework of the use according to the invention are, for example, butyl rubber, brominated copolymers of isobutylene and p-methylstyrene and mixtures thereof.

Crosslinking resins suitable for the use according to the invention that come into consideration are in particular those which are used in the vulcanization of rubber compositions within the framework of the production of bladders for tyre production. Preferably, crosslinking resins which can form three-dimensional network structures are used. In particular, phenol-formaldehyde resins are suitable in the present case. The ability of this compound group to crosslink is based on the reactivity of the phenolmethylol groups in the phenol-formaldehyde resins, which form under heat exposure and elimination of water an α,β-unsaturated carbonyl compound containing an exo-methylene group, which in turn reacts with an isoprene-based rubber unit to form a chroman ring system. The phenol-formaldehyde resins used contain at least two phenolmethylol groups for the purpose of crosslinking. According to the invention, alkylphenol-formaldehyde resins can in particular be used for crosslinking, wherein alkyl is preferably $C_4$ to $C_{10}$ alkyl, such as in particular octyl. The crosslinking resin can optionally be halogenated, e.g. brominated, such as the brominated octylphenyl-formaldehyde resin SP-1055 available from Akrochem. If a non-halogenated crosslinking resin is used, such as the octylphenyl-formaldehyde resin SP-1045 available from Akrochem, a suitable halogen-containing component is added, such as chloroprene rubber. Acidic substances (Lewis acids such as e.g. $SnCl_2$ or $FeCl_3$) can likewise be used.

The rubber composition preferably contains 0.5 to 30 parts by weight crosslinking resin, more preferably 1 to 20 parts by weight, most preferably 2 to 15 parts by weight, and in particular 2 to 12 parts by weight crosslinking resin, relative to 100 parts by weight rubber (phr, parts per hundred parts rubber).

A rubber composition preferably furthermore contains additives such as fillers (for example carbon black, silica, zinc oxide, calcium carbonate, barium sulfate, magnesium oxides, aluminium oxides, iron oxides, silicates) and substances required for crosslinking (zinc oxide, accelerator, magnesium oxide, sulfur), catalysts/activators for resin crosslinking (for example chloroprene rubber, zinc oxide, stearic acid or salts formed thereof), anti-ageing agents, homogenizers in usual quantities.

In addition, the invention relates to a method for producing a bladder for tyre production in which a rubber composition which contains one or more modified polyorganosiloxanes according to the invention, one or more crosslinking resins for crosslinking and optionally further conventional additives is vulcanized by means of the crosslinking resin. The components are, as disclosed in detail in the examples below, sufficiently intimately mixed using suitable devices and conditions. Mixing processes and devices suitable for this purpose are known to experts per se.

The invention furthermore relates to a bladder for tyre production which comprises a rubber composition that can be vulcanized using crosslinking resin, wherein the rubber composition comprises a modified polyorganosiloxane according to the invention and has been vulcanized by means of the crosslinking resin.

The inventors have surprisingly found that the use of the polyorganosiloxanes according to the invention as plasticizers in a rubber composition significantly extends the service life of a bladder for tyre production produced from this rubber composition compared with a bladder for tyre production which is produced with castor oil as plasticizer (in the same concentration) and with an otherwise identical composition and processing of the vulcanization mixture.

In the context of the present invention, the service life of a bladder is determined with the aid of a test piece in the flexing endurance test according to De Mattia after a steam ageing (48 h at 190° C.). Crack growth of the test pieces of the different compounds is compared with each other. The lower the value for the crack growth with a given number of stress cycles, the longer the service life of the bladder.

Should, depending on the exact composition of the rubber compositions, any reduction in the crosslinking density be observed, this can be compensated for without any problems by increasing the concentration of the crosslinking resin in the rubber composition. The improved resistance of the rubber compositions according to the invention is not significantly impaired in the relevant use in bladders.

Further aspects of the present invention are disclosed in paragraphs A to P below.

A. Use of one or more modified polyorganosiloxanes as plasticizers in rubber compositions, wherein the polyorganosiloxane contains 3 or more siloxane units and one or more organic moieties $R^1$, which have one or more carbon-carbon multiple bonds and at least 4 carbon atoms.

B. Use according to paragraph A, characterized in that $R^1$ contains up to 15 C atoms, wherein $R^1$ is in particular a monovalent unsaturated acyloxy radical (i.e. a radical of the RCOO— type) with up to 15 C atoms, wherein the acyl radical terminally carries a substituted or unsubstituted double bond and is bound to a silicon atom of the backbone of the polyorganosiloxane via a hydrocarbon chain, which preferably contains at least one oxygen atom in the chain and is preferably substituted with at least one hydroxyl group.

C. Use according to paragraph 1 or paragraph 2, characterized in that the modified polyorganosiloxane has two or more organic moieties $R^1$ and/or additionally one or more longer alkyl radicals $R^2$, wherein $R^2$ has a chain length of from 5 to 50 carbon atoms.

D. Use according to paragraph 1 or paragraph 2, characterized in that the rubber is vulcanized by means of one or more crosslinking resins, wherein the rubber comprises in particular butyl rubber, brominated copolymers of isobutylene and p-methylstyrene or mixtures thereof, and chloroprene rubber can be used as crosslinking aid.

E. Use according to one of the preceding paragraphs A to D, characterized in that the rubber composition which contains the polyorganosiloxane contains one or more further plasticizers, which are not polyorganosiloxanes, in a quantity of less than 5 parts by weight per 100 parts by weight rubber (mixture).

F. Use according to paragraph E, wherein the further plasticizer that is different from polyorganosiloxane comprises castor oil and/or a hydrocarbon resin, preferably comprises castor oil, in particular is castor oil and/or a hydrocarbon resin, in particular is castor oil.

G. Use according to one of paragraphs A to C, characterized in that the rubber composition contains no further plasticizers in addition to the modified polyorganosiloxane.

H. Use according to one of the preceding paragraphs A to G, characterized in that the rubber composition contains further additives and constituents which are suitable for the production of bladders for tyre production.

I. Use according to one of the preceding paragraphs A to H, characterized in that the rubber composition, after vulcanization, is suitable for use as a bladder in tyre production.

J. Use according to one of paragraphs G or H, characterized in that the rubber composition contains, as further constituents, filler, catalyst for a resin crosslinking and optionally further additives, in particular homogenizers.

K. Use according to one of the preceding paragraphs D to J, characterized in that the crosslinking resin is optionally halogenated alkylphenol-formaldehyde resin, wherein the alkyl radical is in particular $C_1$ to $C_{10}$ alkyl.

L. Use according to one of the preceding paragraphs A to K, characterized in that the quantity of polyorganosiloxane in the rubber composition is 3 to 8 parts by weight per 100 parts by weight rubber (mixture) and in particular in that the rubber composition comprises crosslinking resin in a concentration of from 2 parts by weight to 12 parts by weight per 100 parts by weight rubber (mixture).

M. Use according to one of the preceding paragraphs A to L, characterized in that the service life of a bladder for tyre production produced from the rubber composition is extended by a factor of greater than 1.2, as determined by means of the crack growth according to De Mattia, compared with a bladder for tyre production which is produced with castor oil as plasticizer (in the same concentration) and with an otherwise identical composition and processing of the vulcanization mixture.

N. Use according to one of the preceding paragraphs A to M without disadvantageously changing one or more of the following physical properties: delta torque, modulus, compression set, compared with a rubber composition which contains a corresponding quantity of castor oil as plasticizer.

O. Method for producing a bladder for tyre production, in which a rubber composition which contains one or more modified polyorganosiloxanes, one or more crosslinking resins for crosslinking and optionally further conventional additives is vulcanized by means of the crosslinking resin, wherein the modified polyorganosiloxane and the rubber composition are as defined in one of the above paragraphs A to N.

P. Bladder for tyre production, which comprises a rubber composition that can be vulcanized using crosslinking resin, which rubber composition comprises modified polyorganosiloxane and has been vulcanized by means of the crosslinking resin, wherein the modified polyorganosiloxane and the rubber composition are as defined in one of the above paragraphs A to O.

The advantages of the invention follow in particular from the following examples. All quantities, unless otherwise indicated, relate to the weight.

EXAMPLES

Preparation of Polyorganosiloxanes According to the Invention

The synthesis of the polyorganosiloxanes according to the invention is illustrated below on the basis of a selected example ("POS"):

In a first reaction step, 7.63 g (0.057 mol) tetramethyldisiloxane, 14.8 g (0.006 mol) polymethyl hydrogen siloxane and 76.3 g (0.26 mol) octamethylcyclotetrasiloxane are reacted in the presence of a calcium bentonite catalyst (3%) in a three-necked flask to give a hydrogen dimethylpolysiloxane ($M^H_2D^H_4D_{18}$) [i.e. of the silicon atoms of the total (on average) of 24 siloxane units in the compound, (on average) both terminal ones ($M^H$) and 4 pendant ones ($D^H$) are substituted with in each case one hydrogen atom and are available for the subsequent functionalization].

In the second reaction step, 64.63 g (0.038 mol) of the hydrogen dimethylpolysiloxane is introduced and heated to 80° C. Then, the catalyst (10 ppm Speier's catalyst) is added and 8.38 g (0.033 mol) of an α-olefin (chain length $C_{14}$ to $C_{22}$) is slowly added. The reaction takes place at 90° C.

In the third reaction step, 26.89 g (0.236 mol) allyl glycidyl ether is slowly added at 80° C. The degree of conversion is monitored via an infrared spectroscopic HSi measurement. If no more HSi is detected, the reaction is complete and excess constituents are distilled.

In the fourth reaction step, 83.91 g (0.034 mol) of the product formed in step 3 is heated to 80° C. with a catalyst (triethylamine or 1,4-diazabicyclo[2.2.2]octane 0.5%) and an inhibitor (butylhydroxytoluene 0.2%), and 15.09 g (0.175 mol) methacrylic acid is slowly added dropwise. The subsequent reaction takes place at 95° C. and is monitored via the acid number.

POS is a short, di-terminal and poly-pendant, functionalized polyorganosiloxane.

Chemicals

The following chemicals were used (Table 1).

TABLE 1

Chemicals

| Trade name | Explanation | Manufacturer/Supplier |
|---|---|---|
| Butyl RB 301 | Copolymer of isobutylene and isoprene with average isoprene content. Mooney viscosity ML (1 + 8) at 125° C.: 46-56 MU. | Arlanxeo |
| Neoprene WRT | Copolymer of chloroprene and 2,3-dichloro-1,3-butadiene with a Mooney viscosity ML (1 + 4) at 100° C. of 41-51 MU. | Denka Polymers |
| Luvomaxx BC N-330 | Carbon black | Lehmann & Voss & Co |
| Zinkoxid Harzsiegel GR | Zinc oxide (ZnO) | Norzinco GmbH |
| Struktol ® 40 MS Flakes | Mixture of dark aromatic and aliphatic hydrocarbon resins | Schill + Seilacher "Struktol" GmbH |
| ALBERDINGK ® Rizinusöl First | Castor oil | Alberdingk Boley GmbH |
| SP 1045H | Octylphenol crosslinking resin with a methylol content of from 9.5% to 11.0% | SI Group |

Furthermore, the following polyorganosiloxane was used according to the invention:

the modified polydimethylsiloxane POS prepared above.

Test Methods

The following test methods were used.

Mooney viscosity: ISO 289-1 Rubber, unvulcanized—Determinations using a shearing-disc viscometer—Part 1: Determination of Mooney viscosity.

Shore A hardness: DIN ISO 7619-1: 2012-02 Rubber, vulcanized or thermoplastic—Determination of indentation hardness—Part 1: Durometer method (Shore hardness).

Tensile strength/stress values/elongation at break: DIN 53504 Testing of rubber—Determination of tensile strength at break, tensile stress at yield, elongation at break and stress values in a tensile test.

Tear strength: DIN ISO 34-1 DIN Rubber, vulcanized or thermoplastic—Determination of tear strength—Part 1: Trouser, angle and crescent test pieces.

Crack growth: DIN ISO 132 Rubber, vulcanized or thermoplastic—Determination of flex cracking and crack growth (De Mattia).

Crosslinking: DIN 53529 Part 2—Testing of rubber and elastomers; curemetry; determination of vulcanization characteristics and evaluation of crosslinking isotherms in terms of reaction kinetics.

Rubber Compositions

The following rubber compositions 1 to 4, which contain the following constituents, were prepared, wherein all quantities are in parts by weight (Table 2).

TABLE 2

Quantities of the rubber composition constituents

| | 1 | 2 | 3 | 4 |
|---|---|---|---|---|
| Butyl RB 301 (IIR) | 100 | 100 | 100 | 100 |
| Neoprene WRT | 5 | 5 | 5 | 5 |
| Luvomaxx BC N-330 | 50 | 50 | 50 | 50 |
| ZnO Harzsiegel | 5 | 5 | 5 | 5 |
| Struktol 40 MS Flakes | 5 | 5 | 5 | 5 |
| Castor oil | 6 | 3 | — | — |
| POS | — | 3 | 6 | 6 |
| SP 1045H | 8 | 8 | 8 | 10 |
| Total | 179 | 179 | 179 | 181 |

The rubber compositions 1 to 4 were prepared as described below.

Rubber Composition 1

A mixture of 50 parts by weight carbon black (Luvomaxx BC N-330), 5 parts by weight zinc oxide (Harzsiegel GR), 5 parts by weight Struktol 40 MS Flakes, 6 parts by weight castor oil as well as 100 parts by weight butyl rubber (Butyl RB 301) and 5 parts by weight chloroprene rubber (Neoprene WRT) was placed in a laboratory internal mixer in the upside-down mix method at a starting temperature of 80° C. and 70 revolutions/minute.

After 30 seconds, the ram was raised and brushed, and after 180 seconds the mixture was discharged.

After 24 hours, 8 parts by weight of the octylphenol crosslinking resin (SP 1045) were incorporated into the resulting composition on the mill at 100° C. Mixing was carried out for a total of 10 minutes.

Rubber Composition 2

A mixture of 50 parts by weight carbon black (Luvomaxx BC N-330), 5 parts by weight zinc oxide (Harzsiegel GR), 5 parts by weight Struktol 40 MS Flakes, 3 parts by weight castor oil and 3 parts by weight POS as well as 100 parts by weight butyl rubber (Butyl RB 301) and 5 parts by weight chloroprene rubber (Neoprene WRT) was placed in a laboratory internal mixer in the upside-down mix method at a starting temperature of 80° C. and 70 revolutions/minute.

After 30 seconds, the ram was raised and brushed, and after 180 seconds the mixture was discharged.

After 24 hours, 8 parts by weight of the octylphenol crosslinking resin (SP 1045) were incorporated into the resulting composition on the mill at 100° C. Mixing was carried out for a total of 10 minutes.

Rubber Composition 3

A mixture of 50 parts by weight carbon black (Luvomaxx BC N-330), 5 parts by weight zinc oxide (Harzsiegel GR), 5 parts by weight Struktol 40 MS Flakes, 6 parts by weight POS as well as 100 parts by weight butyl rubber (Butyl RB 301) and 5 parts by weight chloroprene rubber (Neoprene WRT) was placed in a laboratory internal mixer in the upside-down mix method at a starting temperature of 80° C. and 70 revolutions/minute.

After 30 seconds, the ram was raised and brushed, and after 180 seconds the mixture was discharged.

After 24 hours, 8 parts by weight of the octylphenol crosslinking resin (SP 1045) were incorporated into the resulting composition on the mill at 100° C. Mixing was carried out for a total of 10 minutes.

Rubber Composition 4

A mixture of 50 parts by weight carbon black (Luvomaxx BC N-330), 5 parts by weight zinc oxide (Harzsiegel GR), 5 parts by weight Struktol 40 MS Flakes, 6 parts by weight POS as well as 100 parts by weight butyl rubber (Butyl RB 301) and 5 parts by weight chloroprene rubber (Neoprene WRT) was placed in a laboratory internal mixer in the upside-down mix method at a starting temperature of 80° C. and 70 revolutions/minute.

After 30 seconds, the ram was raised and brushed, and after 180 seconds the mixture was discharged.

After 24 hours, 10 parts by weight of the octylphenol crosslinking resin (SP 1045) were incorporated into the resulting composition on the mill at 100° C. Mixing was carried out for a total of 10 minutes.

Degree of Crosslinking of Rubber Compositions 1 to 4

Using an RPA 2000 device, the torque of rubber compositions 1 to 4 was determined as a measure of the crosslinking in an isothermal measurement at 210° C. (Table 3).

TABLE 3

Crosslinking RPA 2000 at 210° C.

|  | 1 | 2 | 3 | 4 |
|---|---|---|---|---|
| Torque ML [dNm] | 1.87 | 1.91 | 2.03 | 1.93 |
| Torque MH [dNm] | 8.05 | 6.49 | 5.70 | 6.74 |
| delta torque (MH-ML) [dNm] | 6.18 | 4.58 | 3.67 | 4.81 |
| to 10% [min] | 0.84 | 0.68 | 0.57 | 0.61 |
| to 90% [min] | 13.05 | 9.62 | 6.53 | 7.78 |

Vulcanization of Rubber Compositions 1 to 4

2 mm test plates and 6 mm test pieces were in each case produced from rubber compositions 1 to 4. For the vulcanization, the 2 mm test plates were vulcanized for 13 minutes at 210° C. and the 6 mm test pieces were vulcanized for 14 minutes under the same conditions. The following properties of the vulcanized rubber compositions 1 to 4 were determined (Table 4).

TABLE 4

Properties of the vulcanized rubber compositions 1 to 4

|  | 1 | 2 | 3 | 4 |
|---|---|---|---|---|
| Vulc. time 2 mm @ 210° C. [min] | 13 | 13 | 13 | 13 |
| Vulc. time 6 mm @ 210° C. [min] | 14 | 14 | 14 | 14 |
| Hardness SH A [SH E] | 56 | 52 | 53 | 58 |
| Elasticity [%] | 8 | 7 | 9 | 9 |
| Tensile strength [MPa] | 12.3 | 12.0 | 9.8 | 11.5 |
| Standard dev. (sigma n − 1) | 1.08 | 0.38 | 0.42 | 1.12 |
| Elongation at break [%] | 640 | 741 | 697 | 670 |
| Standard dev. (sigma n − 1) | 45.39 | 15.63 | 31.91 | 65.66 |

TABLE 4-continued

Properties of the vulcanized rubber compositions 1 to 4

|  | 1 | 2 | 3 | 4 |
|---|---|---|---|---|
| Modulus 100% [MPa] | 1.5 | 1.1 | 1.1 | 1.4 |
| Modulus 300% [MPa] | 4.2 | 3.1 | 2.8 | 3.7 |
| Modulus 500% [MPa] | 8.4 | 6.6 | 5.9 | 7.6 |
| Tear strength trouser [kN/m] | 16.6 | 16.5 | 15.5 | 16.6 |
| DVR 24 h/100° C. 25% [%] | 28.4 | 33.6 | 41.0 | 28.2 |
| Density [g/cm3] | 1.110 | 1.112 | 1.107 | 1.115 |

Figure 1:
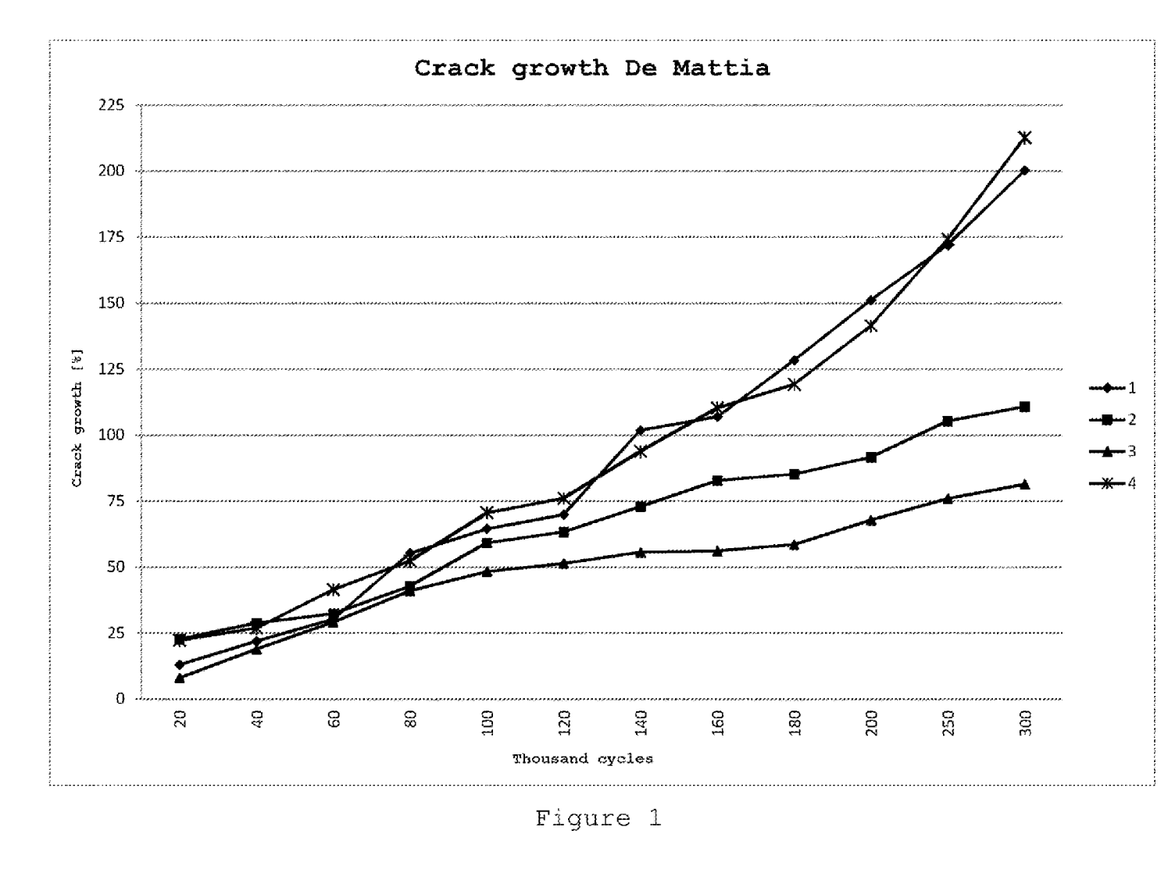
FIG. 1 shows the results of the flexing endurance test according to De Mattia for the vulcanized rubber compositions 1 to 4.

The vulcanized rubber compositions 1 to 4 were also investigated in the flexing endurance test according to De Mattia (Table 5 and FIG. 1).

TABLE 5

The vulcanized rubber compositions 1 to 4 in the flexing endurance test according to De Mattia [%]

| Thousand cycles | 1 | 2 | 3 | 4 |
|---|---|---|---|---|
| 20 | 13.0 | 22.8 | 8.0 | 22.3 |
| 40 | 21.9 | 28.9 | 19.0 | 26.9 |
| 60 | 30.2 | 32.4 | 29.1 | 41.5 |
| 80 | 55.2 | 42.7 | 41.0 | 52.3 |
| 100 | 64.5 | 59.2 | 48.4 | 70.6 |
| 120 | 69.9 | 63.3 | 51.4 | 76.1 |
| 140 | 101.8 | 72.9 | 55.6 | 93.8 |
| 160 | 107.0 | 82.9 | 56.1 | 110.3 |
| 180 | 128.3 | 85.2 | 58.5 | 119.2 |
| 200 | 151.2 | 91.6 | 67.8 | 141.4 |
| 250 | 171.9 | 105.4 | 76.0 | 174.2 |
| 300 | 200.3 | 110.8 | 81.4 | 212.7 |

Steam Ageing of the Vulcanized Rubber Compositions 1 to 4

The vulcanized rubber compositions 1 to 4 were subjected to a steam ageing for 48 h at 190° C. The following properties of the vulcanized rubber compositions 1 to 4 were determined after the steam ageing. In addition, the changes in the corresponding properties caused by the steam ageing are also indicated below (Table 6).

TABLE 6

Properties of the vulcanized rubber compositions 1 to 4 after steam ageing (48 h at 190° C.) as well as the corresponding change in the properties due to the steam ageing

|  | 1 | 2 | 3 | 4 |
|---|---|---|---|---|
| Hardness SH A [SH E] | 71 | 63 | n.a. | 65 |
| Change in SH A [SH E] | 15 | 11 | n.a. | 7 |
| Elasticity [%] | 11 | 10 | n.a. | 10 |
| Change in elasticity [%] | 3 | 3 | n.a. | 1 |
| Tensile strength [MPa] | 13.2 | 13.0 | 11.4 | 13.3 |
| Change in tensile strength [%] | 7.3 | 8.3 | 16.3 | 25.7 |
| Elongation at break [%] | 537 | 607 | 615 | 599 |
| Change in elongation at break [%] | −16.1 | −18.1 | −11.8 | −10.6 |
| Modulus 100% [MPa] | 2.3 | 1.7 | 1.4 | 1.7 |
| Change in modulus 100% [%] | 53.3 | 54.5 | 27.3 | 21.4 |
| Modulus 300% [MPa] | 6.5 | 5.1 | 4.2 | 5.2 |
| Change in modulus 300% [%] | 54.8 | 64.5 | 50.0 | 40.5 |
| Modulus 500% [MPa] | 12.1 | 10.2 | 8.6 | 10.5 |
| Change in modulus 500% [%] | 44.0 | 54.5 | 45.8 | 38.2 |
| Tear strength trouser [kN/m] | 18.9 | 17.7 | 16.6 | 17.1 |
| Change in tear strength trouser [%] | 13.9 | 7.3 | 7.1 | 3.0 |

Figure 2:
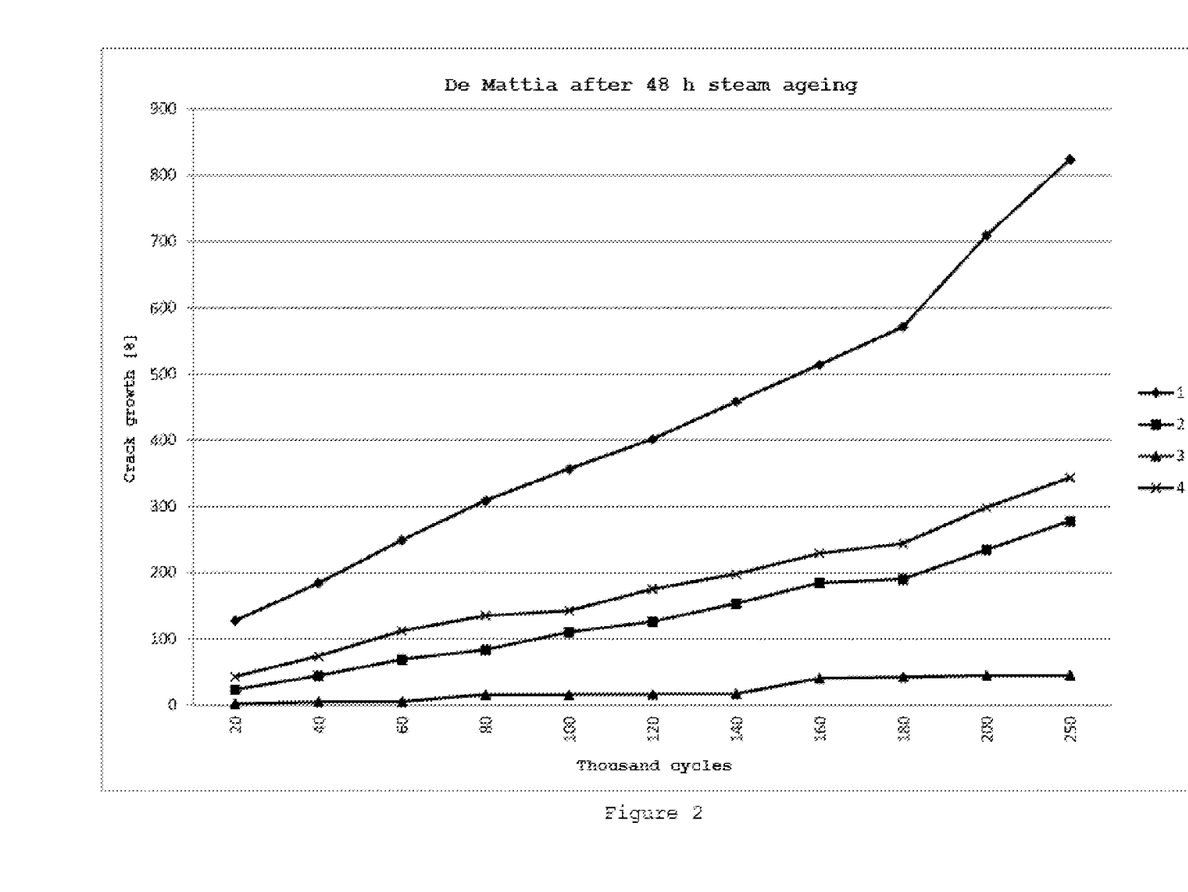
FIG. 2 shows the results of the flexing endurance test according to De Mattia for the vulcanized rubber compositions 1 to 4 after steam ageing (48 h at 190° C.).

The vulcanized rubber compositions 1 to 4 were also investigated after steam ageing (48 h at 190° C.) in the flexing endurance test according to De Mattia (Table 7 and FIG. 2).

TABLE 7

The vulcanized rubber compositions 1 to 4 after steam ageing (48 h at 190° C.) in the flexing endurance test according to De Mattia [%]

| Thousand cycles | 1 | 2 | 3 | 4 |
|---|---|---|---|---|
| 20 | 45.8 | 9.1 | 1.3 | 10.9 |
| 40 | 127.5 | 23.2 | 1.9 | 42.5 |
| 60 | 183.8 | 44.4 | 4.9 | 73.9 |
| 80 | 249.0 | 68.7 | 5.1 | 111.9 |
| 100 | 308.5 | 83.4 | 15.8 | 134.8 |
| 120 | 356.1 | 109.9 | 15.8 | 142.5 |
| 140 | 401.0 | 126.0 | 16.4 | 174.9 |
| 160 | 457.8 | 153.3 | 16.6 | 197.4 |
| 180 | 513.3 | 184.5 | 40.5 | 228.5 |
| 200 | 570.7 | 189.9 | 42.1 | 243.9 |
| 250 | 709.2 | 234.5 | 44.5 | 298.2 |
| 300 | 823.2 | 277.8 | 44.5 | 342.9 |

Evaluation of the Measurement Data

Rubber composition 1 illustrates the state of the art and serves as a comparison (control). By using 3 phr POS in combination with 3 phr castor oil in rubber composition 2 or 6 phr POS in rubber composition 3, the vulcameter curve is reduced depending on the quantity of POS used. Through the use of 6 phr POS in combination with a 2 phr higher use of crosslinking resin SP 1045, the vulcameter curve of rubber composition 4 reaches a comparable level to that of rubber composition 1.

Consideration of the results after steam ageing (48 h at 190° C.) in an autoclave produces a comparable trend. It should be noted here that the test pieces of the vulcanized rubber composition 3 were significantly swollen, with the result that no physical values could be determined. This may be due to insufficient crosslinking of the vulcanized rubber composition 3.

The vulcanized rubber composition 4 has a very balanced property profile. It is particularly noteworthy that the vulcanized rubber composition 4, in terms of the crack growth according to De Mattia, now clearly contrasts with the control (rubber composition 1) and has a significantly improved crack resistance.

Rubber composition 1 also exhibits worse flexibility of the vulcanisate. This is illustrated by the substantial increases in Shore hardness, tensile strength and modulus.

The use of only 3 phr POS in combination with 3 phr castor oil (rubber composition 2) leads to good results in the flexing endurance test (De Mattia test) as well.

The invention claimed is:

1. A process of using one or more modified polyorganosiloxane as a plasticizer in a rubber composition, the method comprising:
combining the one or more modified polyorganosiloxane with rubber to form a combination;
vulcanizing the rubber in the combination by vulcanizing with one or more crosslinking resin; and
using the vulcanized rubber to form the rubber composition, wherein the rubber composition comprises the one or more modified polyorganosiloxane,
wherein the one or more modified polyorganosiloxane contains 3 or more siloxane units and:
one or more organic moiety $R^1$, which have one or more carbon-carbon multiple bonds and at least 4 carbon atoms, and one or more alkyl radicals $R^2$, wherein $R^2$ has a chain length of from 5 to 50 carbon atoms and is longer that a chain length of $R^1$; or
two or more organic moieties $R^1$, which have one or more carbon-carbon multiple bonds and at least 4 carbon atoms.

2. The process according to claim 1, wherein $R^1$ comprises a monovalent unsaturated acyloxy radical with up to 15 C atoms, and wherein the monovalent unsaturated acyloxy radical terminally carries a substituted or unsubstituted double bond and is bound to a silicon atom of the backbone of the one or more modified polyorganosiloxane via a hydrocarbon chain.

3. The process according to claim 1, wherein the one or more modified polyorganosiloxane has two or more organic moieties $R^1$, which have one or more carbon-carbon multiple bonds and at least 4 carbon atoms.

4. The process according to claim 1, wherein the rubber comprises butyl rubber, brominated copolymers of isobutylene and p-methylstyrene, or mixtures thereof, and wherein chloroprene rubber is used as a crosslinking aid when vulcanizing the rubber in the combination.

5. The process according to claim 1, wherein the rubber composition contains one or more further plasticizer in a quantity of greater than 0 and less than 5parts by weight per 100 parts by weight rubber.

6. The process according to claim 5, wherein the one or more further plasticizer comprises castor oil and/or a hydrocarbon resin.

7. The process according to claim 1, wherein the rubber composition comprises no further plasticizers in addition to the one or more modified polyorganosiloxane.

8. The process according to claim 1, wherein the rubber composition comprises further additives and constituents for the production of bladders for tyre production.

9. The process according to claim 1, further comprising using the rubber composition in a bladder in tyre production.

10. The process according to claim 7, wherein the rubber composition further comprises a filler and a catalyst for a resin crosslinking.

11. The process according to claim 1, wherein the one or more crosslinking resin is a halogenated alkylphenol-formaldehyde resin, wherein an alkyl radical of the halogenated alkylphenol-formaldehyde resin is a C1 to C10 alkyl.

12. The process according to claim 1, wherein the quantity of the one or more modified polyorganosiloxane in the rubber composition is 3 to 8 parts by weight per 100parts by weight rubber and the rubber composition comprises the one or more crosslinking resin in a concentration of from 2 parts by weight to 12 parts by weight per 100 parts by weight rubber.

13. The process according to claim 1, wherein the total number of siloxane units of the one or more modified polyorganosiloxane is 10 to 100.

14. The process according to claim 1, wherein a bladder for tyre production produced from the rubber composition has a service life that is extended by a factor of greater than 1.2, as determined by means of the crack growth according to De Mattia, compared with a different bladder for tyre production which is produced using the same process except that castor oil replaces in function and concentration the one or more modified polyorganosiloxane as a plasticizer.

15. The process according to claim 1, wherein the rubber composition has the same or has an improved delta torque, modulus, and/or compression set compared with a different rubber composition which is produced using the same process except that castor oil replaces in function and concentration the one or more modified polyorganosiloxane as a plasticizer.

16. A method for producing a bladder for tyre production, the method comprising vulcanizing a rubber composition which contains one or more modified polyorganosiloxane by using one or more crosslinking resin, wherein the one or more modified polyorganosiloxane contains 3 or more siloxane units and one or more organic moieties $R^1$, which have one or more carbon-carbon multiple bonds and at least 4 carbon atoms.

17. A bladder for tyre production, the bladder comprising a rubber composition vulcanized using a crosslinking resin, wherein the rubber composition comprises one or more modified polyorganosiloxane, wherein the one or more modified polyorganosiloxane contains 3 or more siloxane units and two or more organic moieties $R^1$, which have one or more carbon-carbon multiple bonds and at least 4 carbon atoms.

* * * * *